United States Patent
Bueno de Almeida et al.

(10) Patent No.: US 7,700,675 B2
(45) Date of Patent: Apr. 20, 2010

(54) PLASTICIZED POLY VINYL CHLORIDE COMPOSITIONS

(75) Inventors: Wanderson Bueno de Almeida, São José dos Campos (BR); Katia Braga, São José dos Campos (BR); Henrique Jorge Sousa Sales, São José dos Campos (BR)

(73) Assignee: Cognis Brazil Ltda, Sao Paulo, SP (BR)

( * ) Notice: Subject to any disclaimer, the term of this patent is extended or adjusted under 35 U.S.C. 154(b) by 1159 days.

(21) Appl. No.: 10/536,600

(22) PCT Filed: Dec. 6, 2002

(86) PCT No.: PCT/BR02/00175

§ 371 (c)(1),
(2), (4) Date: Dec. 16, 2005

(87) PCT Pub. No.: WO2004/052977

PCT Pub. Date: Jun. 24, 2004

(65) Prior Publication Data

US 2006/0135666 A1    Jun. 22, 2006

(51) Int. Cl.
*C08K 5/15* (2006.01)
(52) U.S. Cl. .................. 524/114; 524/306; 524/321; 524/322
(58) Field of Classification Search .............. 524/114, 524/306, 321, 322
See application file for complete search history.

(56) References Cited

U.S. PATENT DOCUMENTS

| | | | |
|---|---|---|---|
| 2,964,484 A | 12/1960 | Findley et al. | |
| 3,291,629 A | 12/1966 | Magne et al. | |
| 3,377,304 A * | 4/1968 | Kuester et al. | ............... 524/114 |
| 3,803,072 A * | 4/1974 | Graham et al. | ............... 524/113 |
| 4,060,508 A | 11/1977 | Sugahara et al. | |
| 6,797,753 B2 * | 9/2004 | Benecke et al. | ............. 524/114 |
| 2001/0044486 A1 | 11/2001 | Wesch | |

FOREIGN PATENT DOCUMENTS

| | | |
|---|---|---|
| DE | 38 39 418 | 6/1989 |
| EP | 0 337 237 | 10/1989 |
| GB | 934 689 | 8/1963 |
| GB | 1 341 623 | 12/1973 |
| GB | 2 212 808 | 8/1989 |
| WO | WO 01/98404 | 12/2001 |

OTHER PUBLICATIONS

Johannes Wehlmann, "Use of esterified rapeseed oil as plasticizer in plastics processing", Fett/Lipid 101, 1999, No. 6, pp. 249-256.

* cited by examiner

*Primary Examiner*—Peter D Mulcahy
(74) *Attorney, Agent, or Firm*—Smith Moore Leatherwood LLP

(57) ABSTRACT

The invention relates to plasticizer compositions for polyvinyl chloride resins. A plasticized polyvinyl chloride resin contains (a) 100 parts by weight of at least one polyvinyl chloride resin and (b) 0.1 to 200 parts by weight of a plasticizer compounded with the polyvinyl chloride resin, wherein the plasticizer comprises (i) at least one isobutanol ester of a fatty acid with 8 to 24 carbon atoms, wherein, the fatty acid can be saturated or olefinically unsaturated, linear or branched and contain at least one epoxy group per molecule and (ii) at least one methyl ester of a fatty acid with 16 to 18 carbon atoms, wherein, the fatty acid can be saturated or olefinically unsaturated, linear or branched.

11 Claims, No Drawings

PLASTICIZED POLY VINYL CHLORIDE COMPOSITIONS

RELATED APPLICATIONS

This application is filed under 35 U.S.C. § 371 claiming priority from application PCT/BR2002/000175 filed Dec. 6, 2002, the entire contents of which are incorporated herein by reference.

FIELD OF THE INVENTION

The invention relates to plasticized polyvinyl chloride compositions comprising at least one polyvinyl chloride resin and a special plasticizer compounded with said at least one polyvinyl chloride resin.

DESCRIPTION OF THE RELATED ART

WO 01/98404 discloses a plasticized polyvinyl chloride composition comprising (a) at least one polyvinyl chloride resin and (b) a plasticizer compounded with (a) wherein said plasticizer comprises a fatty acid product derived from a vegetable oil having at least 80% by weight of unsaturated fatty acids, wherein said fatty acids are substantially fully esterified with a monool or a polyol, and said esterified unsaturated fatty acids have been substantially fully epoxidized.

In an article entitled "Use of esterified rapeseed oil as plasticizer" in plastics processing" by Johannes Wehlmann it is mentioned that in most cases phthalic acid esters, especially dioctyl phthalate (DOP), are used as plasticizers for polyvinyl chloride (PVC) resins (see Fett/Lipid 101, 1999, No. 6, pages 249-256). However, phthalate plasticizers are criticized because of their environmentally harmful action. The author then describes the use of rape methyl ester as plasticizer.

BRIEF DESCRIPTION OF THE INVENTION

It is an object of the present invention to provide plasticizers for plastics, especially PVC, which overcome the difficulties and disadvantages of the plasticizers of the prior art. It is a further object of the invention that PVC plastisol formulations based on these plasticizers show a reduced viscosity compared with formulations based on phthalic ester type plasticizers like dioctyl phthalate (DOP). As it is known to the artisan plastisols are dispersions of plastics, especially PVC, in plasticizers.

According to the invention this is achieved by plasticized polyvinyl chloride compositions comprising (a) 100 parts by weight of at least one polyvinyl chloride resin and (b) 0.1 to 200 parts by weight of a plasticizer compounded with said at least one polyvinyl chloride resin, wherein said plasticizer comprises (i) esters of fatty acids with 8 to 14 carbon atoms and isobutanol with the proviso that the fatty acids can be saturated or olefinically unsaturated, linear or branched and contain at least one epoxy group per molecule and (ii) one or more methyl esters of fatty acids with 16 to 18 carbon atoms with the proviso that these fatty acids can be saturated or olefinically unsaturated, linear or branched.

In a preferred embodiment of the invention the plasticized poly vinyl chloride compositions are free of phthalic ester type plasticizers and especially free of dioctylphthalate (DOP).

In another embodiment of the invention the weight ratio of compounds (i) and (ii) is within the range 90:10 and 50:50 and especially within the range 65:35 and 55:45.

DETAILED DESCRIPTION OF THE INVENTION

The invention also relates to plasticizer compositions for poly vinyl chloride resins comprising (i) esters of fatty acids with 8 to 24 carbon atoms and isobutanol with the proviso that the fatty acids can be saturated or olefinically unsaturated, linear or branched and contain at least one epoxy group per molecule and (ii) one or more methyl esters of fatty acids with 16 to 18 carbon atoms with the proviso that these fatty acids can be saturated or olefinically unsaturated, linear or branched. Preferably these plasticizer compositions are free of dioctylphthalate. In one embodiment these plasticizer compositions contain compounds (i) and (ii) in an amount that the weight ratio of compounds (i) and (ii) is within the range 90:10 and 50:50 and especially within the range 65:35 and 55:45. In another preferred embodiment these plasticizer compositions contain exclusively compounds (i) and (ii).

The invention also relates to the use of compositions comprising (i) esters of fatty acids with 8 to 24 carbon atoms and isobutanol with the proviso that the fatty acids can be saturated or olefinically unsaturated, linear or branched and contain at least one epoxy group per molecule and (ii) one or more methyl esters of fatty acids with 16 to 18 carbon atoms with the proviso that these fatty acids can be saturated or olefinically unsaturated, linear or branched as plasticizers for polyvinyl chloride resins. As stated above the compositions are preferably free of phthalic ester type plasticizers.

As also stated above the compositions preferably contain compounds (i) and (ii) in an amount that the weight ratio of compounds (i) and (ii) is within the range 90:10 and 50:50 and especially within the range 65:35 and 55:45. Those compositions which exclusively contain compounds (i) and (ii) are preferred for the use as plasticizers for poly vinyl chloride resins.

EXAMPLES

IES=Isobutyl epoxy stearate

IFAME=Mixture of methyl esters of fatty acids. The distribution of the fatty acid individuals in these methyl esters was (% means mole-%): Straight chain C12=0.3%, branched chain C14=0.4%, straight chain C14=1.0%, branched chain C16=3.7%, straight chain C16=4.9%, branched chain C18=61.4%, straight chain C18=4.6%, cyclic C18=17.5%, straight chain C20=0.1%, aromatic C18=6.1%.

Filler=Calcium Carbonate (Calcit)

Stabilizer=Stabiol CZ 3083 (Liquid Ca/Zn Stabilizer commercially available from COGNIS)

PVC=Polyvinyl chloride produced by emulsion polymerization (Solvic 374 MB commercially available from SOLVAY)

Example 1

(PVC Ball Formulation)

The following compounds were mixed together in a conventional mixer:

| | |
|---|---|
| PVC | 100 phr |
| IES | 60 phr |
| IFAME | 40 phr |
| Filler | 90 phr |
| Stabilizer | 1 phr |

The abbreviation phr means "parts per hundred resin" and is known to the man skilled in the art.

The viscosity of the formulation was measured according to Brookfield (Spindle 5 at 20 rpm). It was 36,000 cps. The value of the viscosity is much lower compared to the formulation of comparative example 1 which is based on dioctyl phthalate as plasticizer.

The formulation was then transferred into a ball by rotational moulding at 180° C. The shore A hardness of the ball was measured. It was 54.8. The value of the shore A hardness is nearly the same as the shore A hardness of the ball in comparative example 1. This shows that the IES/IFAME mixture is as good a plasticizer as the "classical" dioctylphthalate.

Comparative Example 1

(PVC Ball Formulation)
The following compounds were mixed together in a conventional mixer:

| | |
|---|---|
| PVC | 100 phr |
| dioctyl phthalate | 100 phr |
| Filler | 90 phr |
| Stabilizer | 1 phr |

The viscosity of the formulation was measured according to Brookfield (Spindle 7, 5 rpm). It was 125,400 cps.

The formulation was then transferred into a ball by rotational moulding at 180° C. The shore A hardness of the ball was measured; it was 54.0.

We claim:

1. A plasticized polyvinyl chloride composition comprising:
   (a) 100 parts by weight of at least one polyvinyl chloride resin and (b) 0.1 to 200 parts by weight of a plasticizer wherein the plasticizer comprises (i) at least one isobutanol ester of a fatty acid with 8 to 24 carbon atoms, wherein, the fatty acid contains at least one epoxy group per molecule and (ii) at least one methyl ester of a fatty acid with 16 to 18 carbon atoms.

2. The composition according to claim 1 wherein said plasticized polyvinyl chloride composition is free of phthalic ester plasticizers.

3. The composition according to claim 1 wherein the weight ratio of (i) to (ii) is within the range 65:35 to 55:45.

4. A plasticizer composition for polyvinyl chloride resins comprising (i) at least one isobutanol ester of a fatty acid with 8 to 24 carbon atoms, wherein, the fatty acid contains at least one epoxy group per molecule and (ii) at least one methyl ester of a fatty acid with 16 to 18 carbon atoms.

5. The composition according to claim 4, wherein, the composition is free of phthalic ester plasticizers.

6. The composition according to claim 4, wherein, a weight ratio of (i) to (ii) is within the range 65:35 and 55:45.

7. The composition according to claim 4, wherein the plasticizer consists of (i) and (ii) as the plasticizer.

8. A method of plasticizing a polyvinyl chloride resin which comprises: incorporating a plasticizing effective amount of a plasticizer comprising (i) at least one isobutanol ester of a fatty acid with 8 to 24 carbon atoms, wherein, the fatty acid contains at least one epoxy group per molecule and (ii) at least one methyl ester of a fatty acid with 16 to 18 carbon atoms.

9. The method according to claim 8, wherein, the plasticizer is free of phthalic ester plasticizers.

10. The method according to claim 8, wherein, a weight ratio of (i) to (ii) is within a range of 65:35 to 55:45.

11. The method according to claim 8, wherein, the plasticizer contains exclusively (i) and (ii) as the plasticizer.

* * * * *